(12) United States Patent
Chiu et al.

(10) Patent No.: US 8,040,324 B2
(45) Date of Patent: Oct. 18, 2011

(54) MOVEMENT DETECTION METHOD FOR MULTIPLE OBJECTS ON A CAPACITIVE TOUCHPAD

(75) Inventors: Yen-Chang Chiu, Linkou Township, Taipei County (TW); Hsuan-Lung Chung, Lungtan Township, Taoyuan County (TW); Tso-Chieh Yang, Chingshuei Township, Taichung County (TW)

(73) Assignee: Elan Microelectronics Corporation, Hsinchu (TW)

( * ) Notice: Subject to any disclaimer, the term of this patent is extended or adjusted under 35 U.S.C. 154(b) by 778 days.

(21) Appl. No.: 11/519,958

(22) Filed: Sep. 13, 2006

(65) Prior Publication Data

US 2007/0132741 A1    Jun. 14, 2007

(30) Foreign Application Priority Data

Dec. 14, 2005    (TW) .............................. 94144338 A

(51) Int. Cl.
*G06F 3/041*    (2006.01)

(52) U.S. Cl. ........................................................ 345/173
(58) Field of Classification Search .................. 345/173, 345/174; 178/18.01
See application file for complete search history.

(56) References Cited

U.S. PATENT DOCUMENTS

| | | | | |
|---|---|---|---|---|
| 5,825,352 A * | 10/1998 | Bisset et al. | .................. | 345/173 |
| 5,880,411 A * | 3/1999 | Gillespie et al. | ........... | 178/18.01 |
| 6,323,846 B1 * | 11/2001 | Westerman et al. | ........... | 345/173 |
| 6,570,557 B1 * | 5/2003 | Westerman et al. | ........... | 345/173 |
| 2006/0279551 A1 * | 12/2006 | Lii et al. | ........................ | 345/173 |
| 2007/0008295 A1 * | 1/2007 | Chien et al. | .................... | 345/173 |
| 2007/0013669 A1 * | 1/2007 | Chien et al. | .................... | 345/173 |
| 2007/0013670 A1 * | 1/2007 | Chien et al. | .................... | 345/173 |
| 2007/0165005 A1 * | 7/2007 | Lii et al. | ........................ | 345/173 |

\* cited by examiner

*Primary Examiner* — Chanh Nguyen
*Assistant Examiner* — Robert Stone
(74) *Attorney, Agent, or Firm* — Rosenberg, Klein & Lee

(57) ABSTRACT

In a movement detection method for multiple objects on a capacitive touchpad, the waveform of sensed values on the touchpad is monitored for its variation to determine respective movements of the objects on the touchpad, and various operational gestures are further determined exactly.

16 Claims, 14 Drawing Sheets

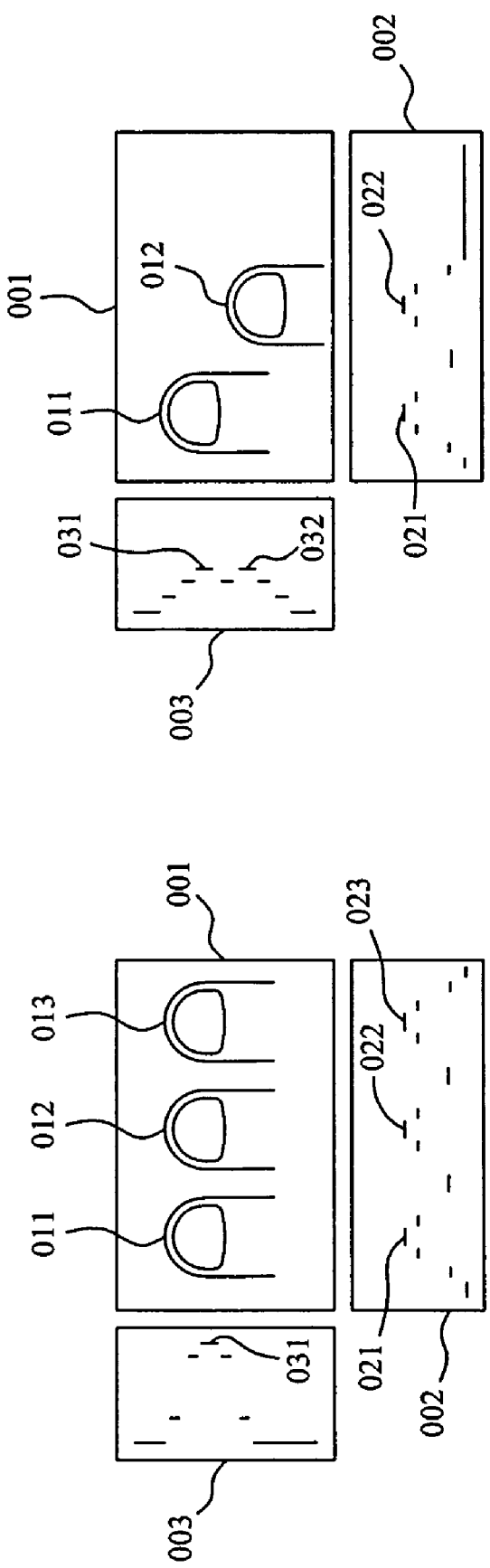

MOVEMENT DETECTION METHOD FOR MULTIPLE OBJECTS ON A CAPACITIVE TOUCHPAD

FIELD OF THE INVENTION

The present invention is generally related to a detection method for a touchpad and, more specifically, to a movement detection method for multiple objects on a capacitive touchpad.

BACKGROUND OF THE INVENTION

Capacitive touchpad is used as an input device to control cursor movement by providing a smooth panel for user's finger or conductive object to touch or move thereon. Since a capacitive touchpad is very thin, it can be designed into an ultra-thin notebook, a keyboard, a digital player and other devices, and further, its non-mechanical design makes it very easy to be maintained.

FIG. 1 shows a cross-sectional view of a typical two-dimensional capacitive touchpad 100, which comprises a panel 102, a Y-axis sensing layer 104, an insulator layer 106, an X-axis sensing layer 108, and a bottom plate 110. When a finger 112 touches on the panel 102, the sensed value on the touched position will have a variation, and the control circuit connected to the touchpad 100 can convert the capacitances on the touchpad 100 to the sensed value as shown in FIG. 2, by which the position where the finger 112 touches and the moving distance and the moving direction of the finger 112 can be determined. Conventionally, the sensed value from the touchpad 100 is used to determine if an object touches on the touchpad 100 by the way as shown in FIG. 3. When the sensed value is greater than a threshold value th, it is determined that an object touches on the touchpad 100; on the contrary, when the sensed value is less than the threshold value th, it is determined that the object leaves the touchpad 100 or no object touches on the touchpad 100.

However, the way to operate programs or devices by detecting gestures of single object, such as touching down to a touchpad, leaving from a touchpad, and moving on a touchpad, could no longer fulfill users' requirements in current electronic products. For this reason, there is a need to detect double or even more objects on a touchpad. Specifically, the actions of multiple objects operating on a touchpad can be defined as various gestures to vary the operations.

There have been proposed several detection methods for multiple objects touching on a touchpad. For example, in U.S. Pat. No. 5,825,352 issued to Stephen et al., the waveform of sensed values is detected to determine the object touching on a touchpad. FIGS. 4A to 4D show the waveforms of sensed values from a touchpad 001 in two directions in a conventional method. In FIGS. 4A to 4D, X profile 002 is the distribution of the sensed values in the horizontal direction of the touchpad 001, and Y profile 003 is the distribution of the sensed values in the vertical direction of the touchpad 001. Each peak of the waveform in the X profile 002 represents an object touching on the touchpad 001. For example, as shown in FIG. 4A, the waveform in the X profile 002 has single peak 021, and it means there is only one object 011 on the touchpad 001. In FIG. 4B, the waveform in the X profile 002 has two peaks 021 and 022, and it means there are two objects 011 and 012 on the touchpad 001. As shown in FIG. 4C, if the waveform in the X profile 002 has three peaks 021, 022, and 023, it means there are three objects 011, 012, and 013 on the touchpad 001. By detecting the number of the objects on the touchpad 001, various gestures could be identified. For instance, two objects moving on the touchpad 001 may be defined as a first gesture, and two objects leaving from the touchpad 001 within a reference time interval since their touching down to the touchpad 001 may be defined as a second gesture, and so on. By this way, practical gestures are increased and the operations become more simple and varied.

However, it cannot determine the respective movements of two or more objects by the foregoing method. For example, as shown in FIG. 4B, two objects 011 and 012 touches on the touchpad 001, resulting in the X profile 002 having two peaks 021 and 022 and the Y profile 002 having one peak 031. Then, if the object 011 starts to move upward and the object 012 keeps still on the touchpad 001, the X profile 002 still has two peaks 021 and 022, while the Y profile 003 splits from one peak 031 to two peaks 031 and 032 as shown in FIG. 4D. It becomes more difficult to determine which object on the touchpad 001 is the moved one. If the movement of respective object can be determined individually, more practical gestures can be defined, and more operations for a touchpad can be applied thereto.

Therefore, it is desired a method for detecting the movement of respective one among multiple objects on a capacitive touchpad.

SUMMARY OF THE INVENTION

An object of the present invention is to provide a movement detection method for multiple objects on a capacitive touchpad, in order to determine respective movements of the multiple objects.

Another object of the present invention is to provide a detection method for multiple objects gesture on a capacitive touchpad.

In a movement detection method for multiple objects on a capacitive touchpad, according to the present invention, variation in the sensed values of respective object on the touchpad is discriminated to determine the movement of respective object on the touchpad for exactly detecting various gesture operations.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which:

FIG. 4C shows the sensed values in two directions on a touchpad when three objects touch the touchpad;

FIG. 4D shows the sensed values in two directions on a touchpad when four objects touch the touchpad;

DETAILED DESCRIPTION OF THE INVENTION

In a method for multiple objects detection on a capacitive touchpad, according to the present invention, the objects can be detected touching down to the touchpad, staying on the touchpad, and moving on the touchpad, and several gestures for operations on the touchpad can be distinguished by such method without any improvement or modification to the hardware detection circuit of the touchpad.

<Determination of Respective Movement of Multiple Objects>

Figure 1:
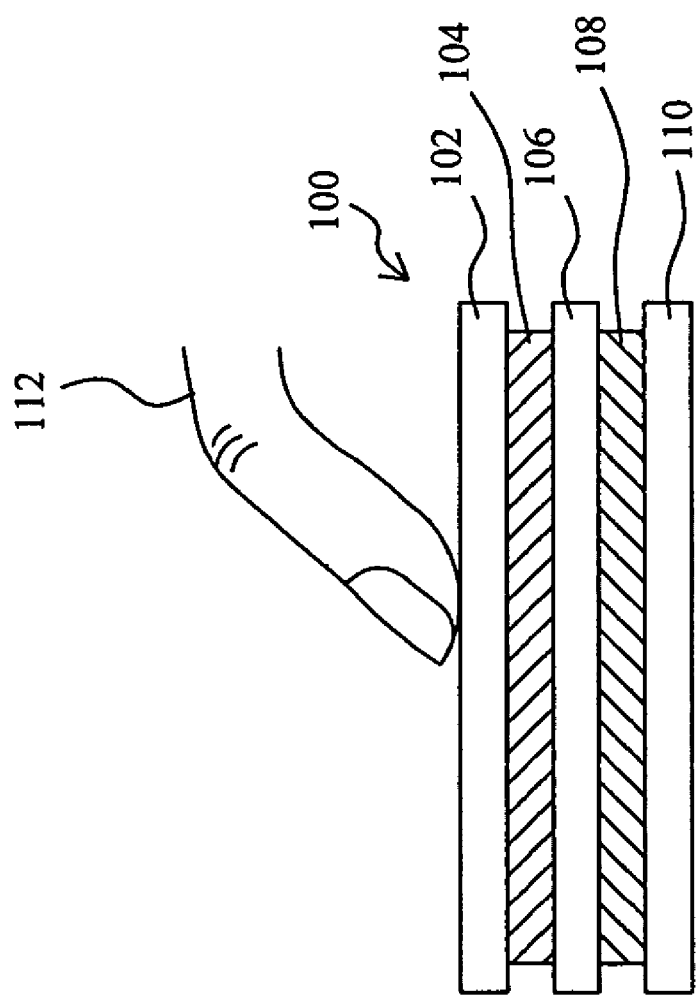
FIG. 1 shows a cross-sectional view of a typical two-dimensional capacitive touchpad.
Figure 2:
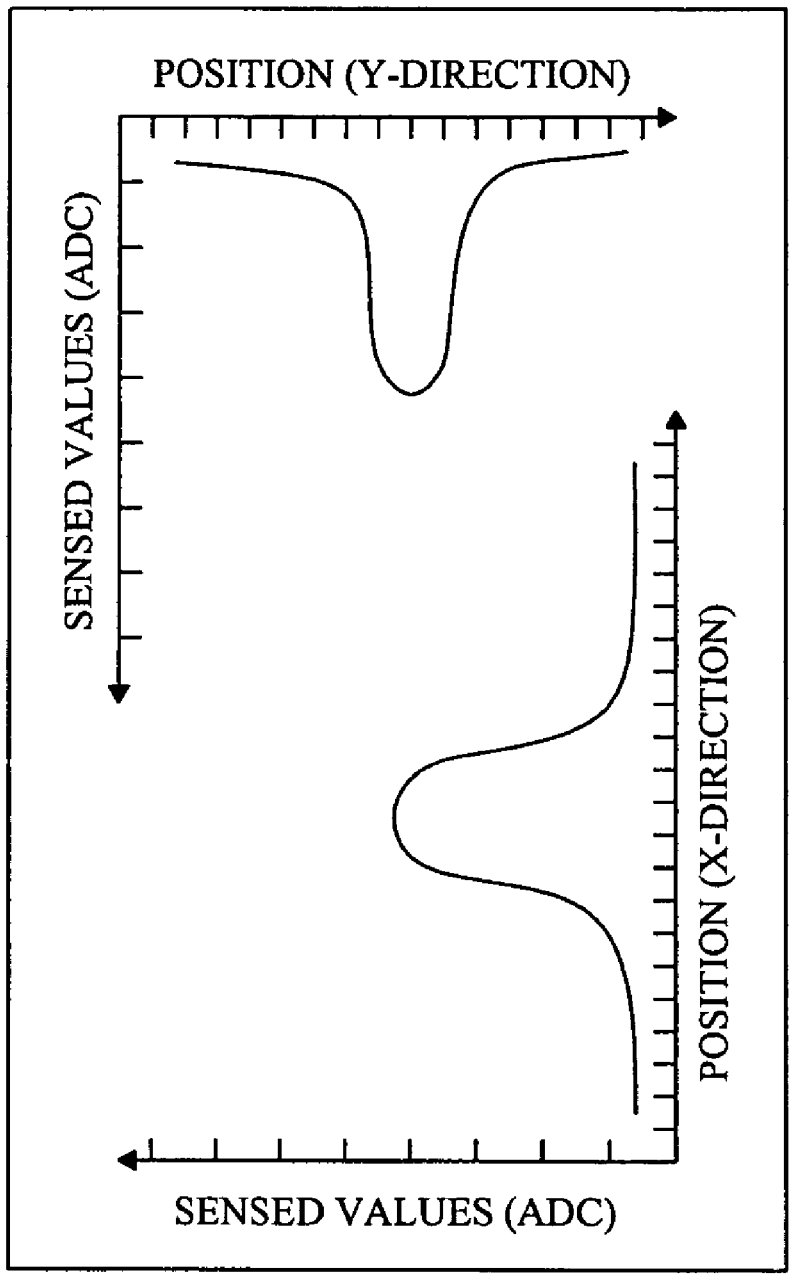
FIG. 2 shows a relationship between the sensed values and the touched position of the touchpad shown in FIG. 1.
Figure 3:
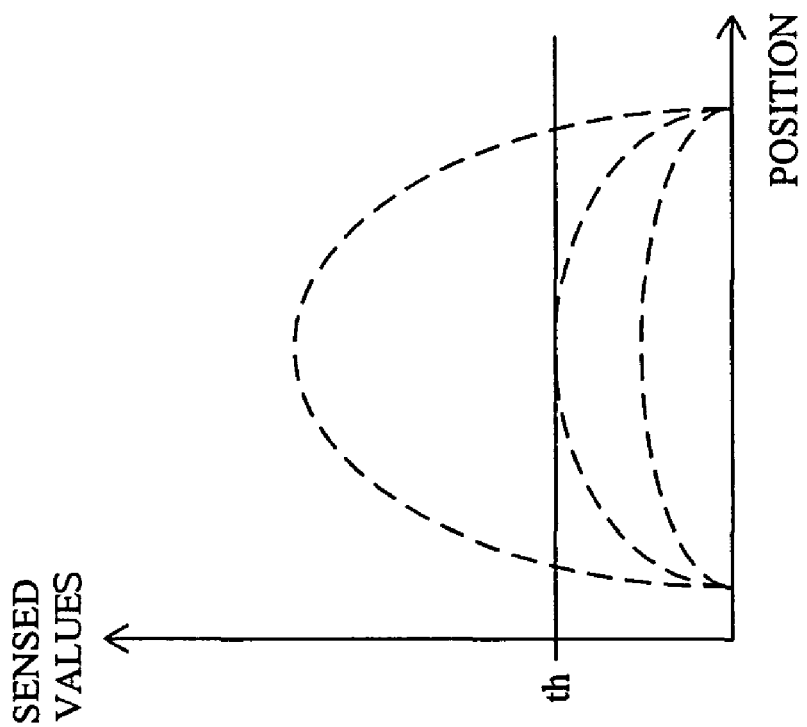
FIG. 3 shows a variation of the sensed values from the touchpad shown in FIG. 1.
Figure 4B:
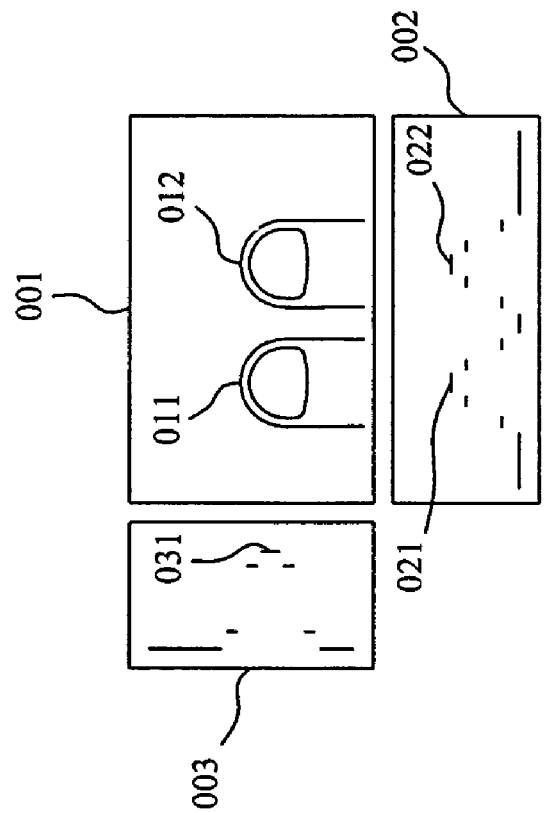
FIG. 4B shows the sensed values in two directions on a touchpad when two objects touch the touchpad.
Figure 4A:
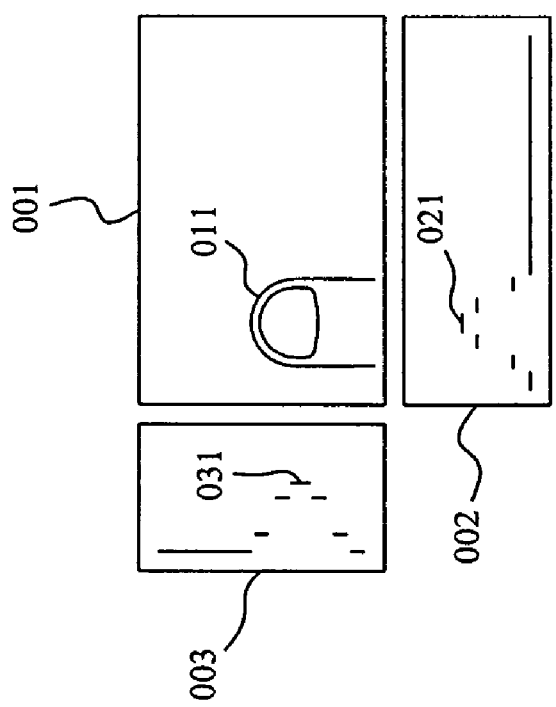
FIG. 4A shows the sensed values in two directions on a touchpad when one object touches the touchpad.
Figure 5:
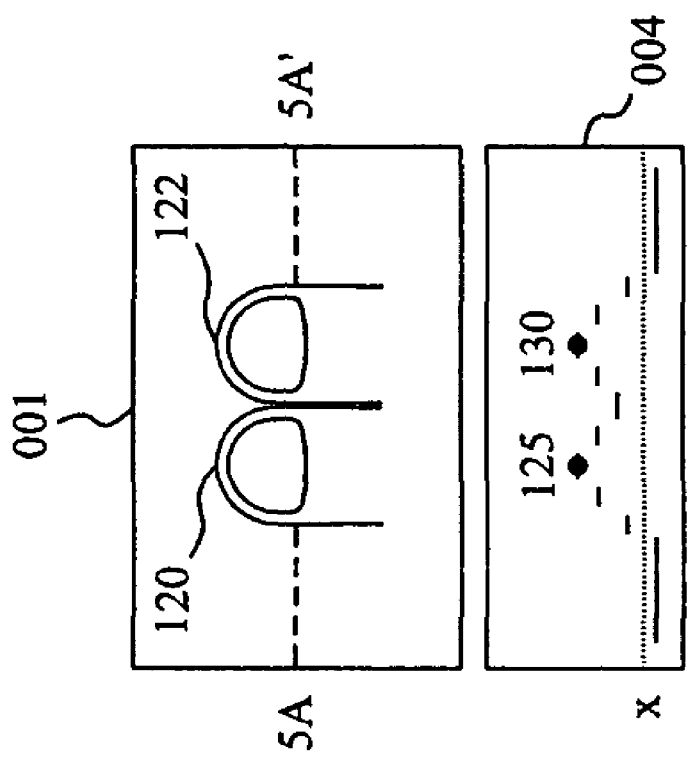
FIG. 5 shows a waveform of sensed value from a touchpad when two objects touch the touchpad in an embodiment of the present invention.
Figure 6A:
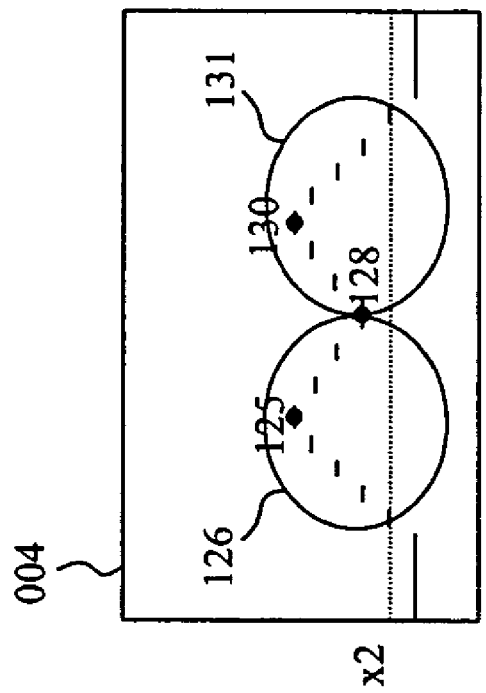
FIG. 6A shows two regions defined by a method in an embodiment of the present invention.
Figure 6B:
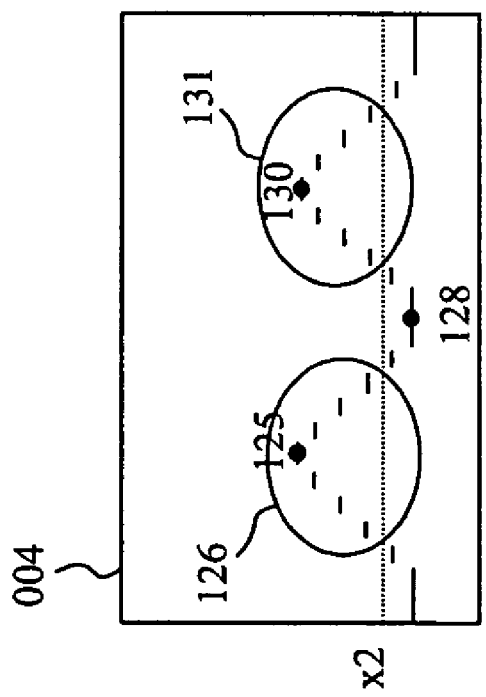
FIG. 6B shows two regions defined by a method in an embodiment of the present invention.

FIG. 5 shows a waveform of sensed values scanned by the sensor of a touchpad 001 when two objects 120 and 122 touch the touchpad 001. In the X profile 004, two peaks 125 and 130 will be identified in the waveform corresponding to the objects 120 and 122, respectively. If both the peaks 125 and 130 have sensed values greater than a threshold value x, it is determined that there are indeed two objects 120 and 122 touching the touchpad 001. As shown in FIGS. 6A and 6B, the waveform will be divided into a region 126 corresponding to the object 120 and a region 131 corresponding to the object 122. In an embodiment, a valley 128 between the peaks 125 and 130 is further identified, and the regions 126 and 131 are so defined that they have the sensed values greater than a threshold value x2. As shown in FIG. 6A, the valley 128 is at the position where the sensed value is lower than the threshold value x2, and thus the regions 126 and 131 will be separated from one another. Alternatively, as shown in FIG. 6B, if the sensed value at the valley 128 is also greater than the threshold value x2, the valley 128 will be the dividing point or boundary that divides the waveform to specify the regions 126 and 131.

Figure 7A:
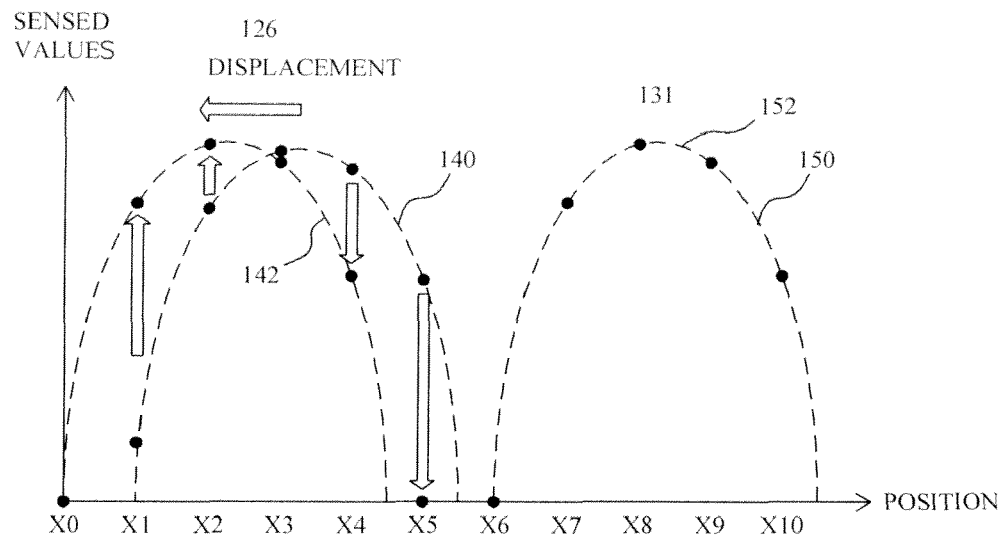
FIG. 7A shows a waveform variation of the sensed values in an embodiment of the present invention.
Figure 7B:
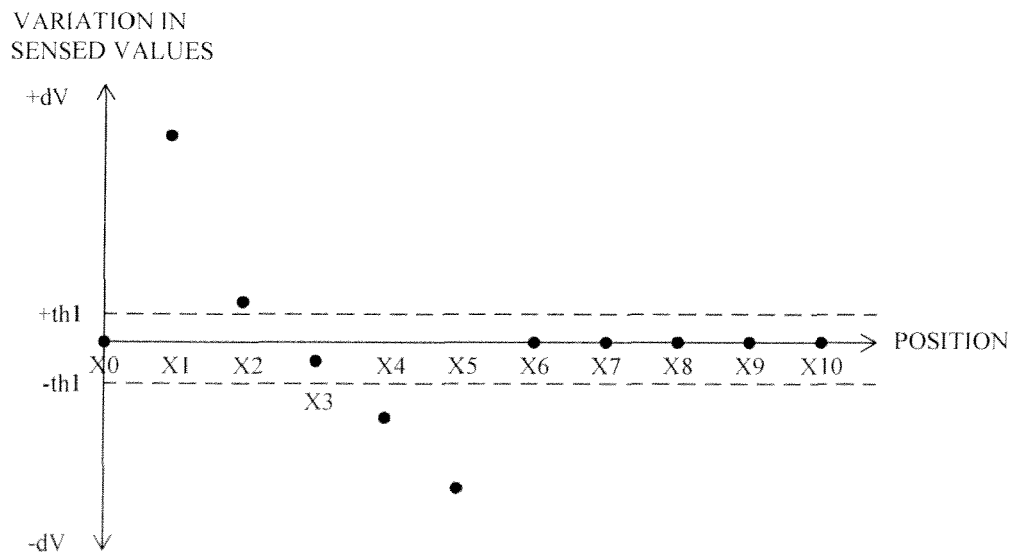
FIG. 7B shows the variation in the sensed values shown in FIG. 7A.
Figure 8A:
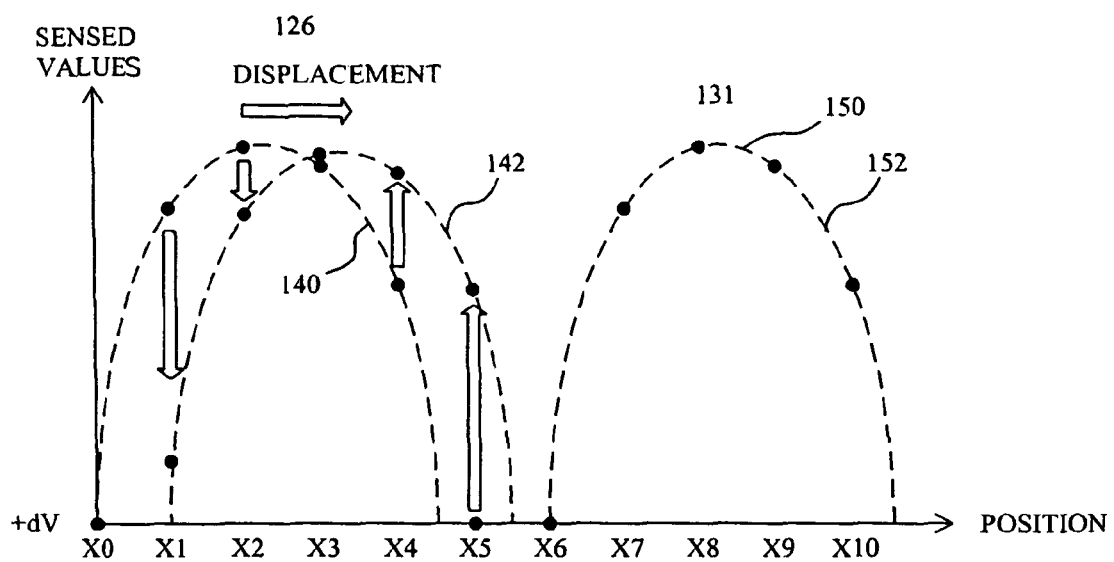
FIG. 8A shows a waveform variation of the sensed values in an embodiment of the present invention.
Figure 8B:
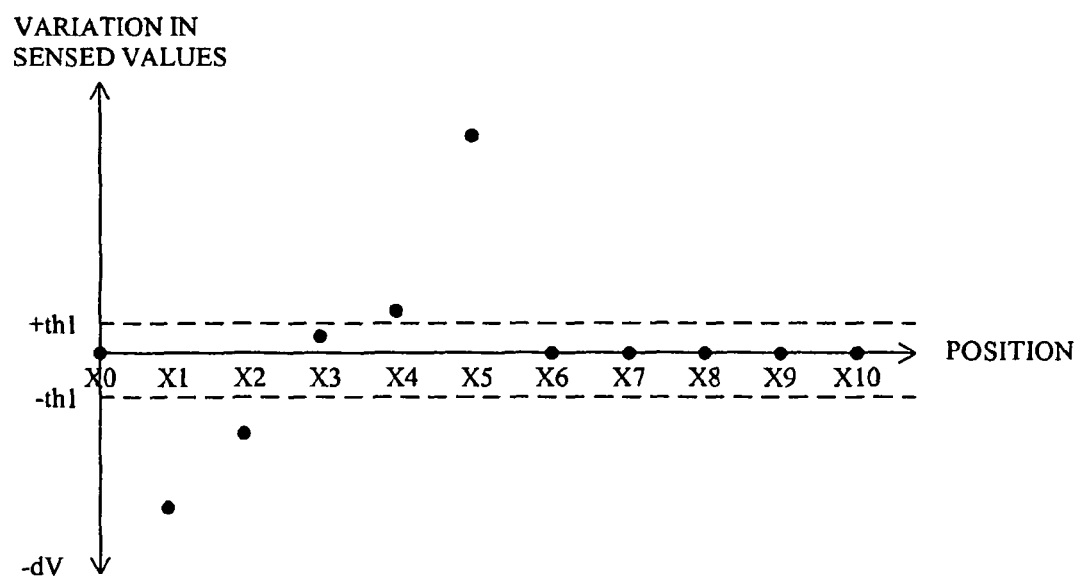
FIG. 8B shows the variation in the sensed values shown in FIG. 8A.

FIGS. 7A to 8B illustrate waveform variations when the object 120 of FIG. 5 moves on the touchpad 001 in two opposite directions. In an embodiment, the touchpad 001 of FIG. 5 is scanned each reference time interval. FIG. 7A shows the sensed values at this time scanning and the previous time scanning, and FIG. 7B shows the variation dV in the sensed values between these two scanning. In FIG. 7A, curves 140 and 150 represent the waveforms of sensed values corresponding to the regions 126 and 131, respectively, at the previous time scanning, and curves 142 and 152 represent the waveforms of sensed values corresponding to the regions 126 and 131, respectively, at this time scanning. As shown in FIG. 7B, the absolute value of the variation dV corresponding to the region 126 is greater than a threshold value th1, and it is thus determined that the object 120 moves on the touchpad 001. Further, as shown in FIGS. 7A and 7B, the sensed values corresponding to the region 126 have a trend of increasing in a direction, leftward in this embodiment, and decreasing in the opposite direction, rightward in this embodiment, it indicates that the object 120 of FIG. 5 has a displacement to the left. FIGS. 8A and 8B show the case that the object 120 moves on the touchpad 001 rightward.

Figure 9A:
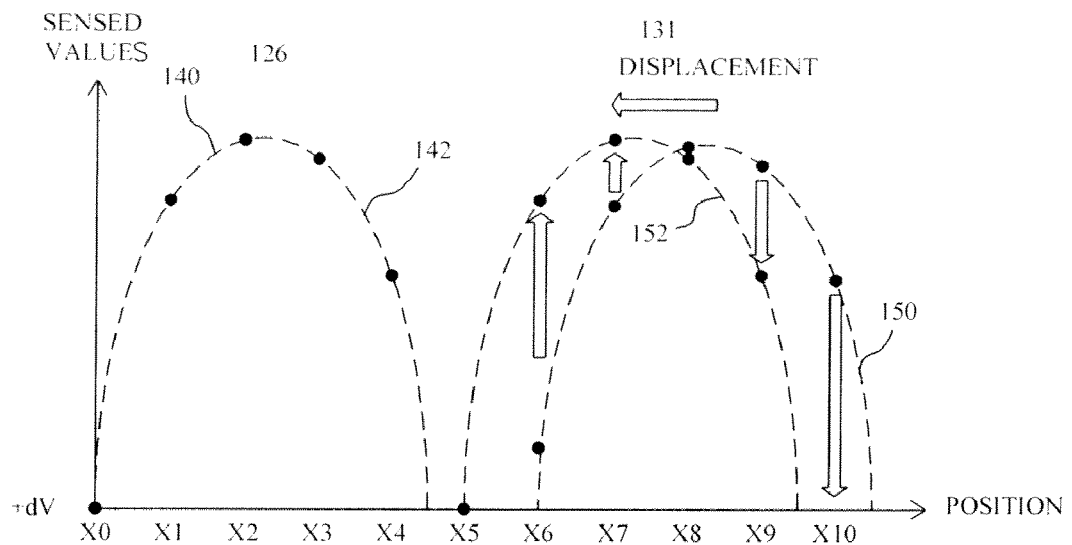
FIG. 9A shows a waveform variation of the sensed values in an embodiment of the present invention.
Figure 9B:
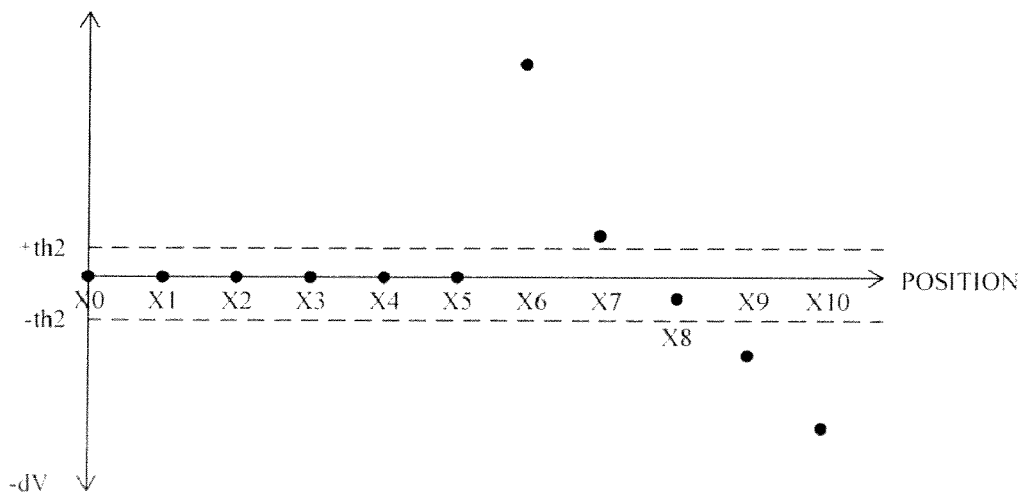
FIG. 9B shows the variation in the sensed values shown in FIG. 9A.
Figure 10A:
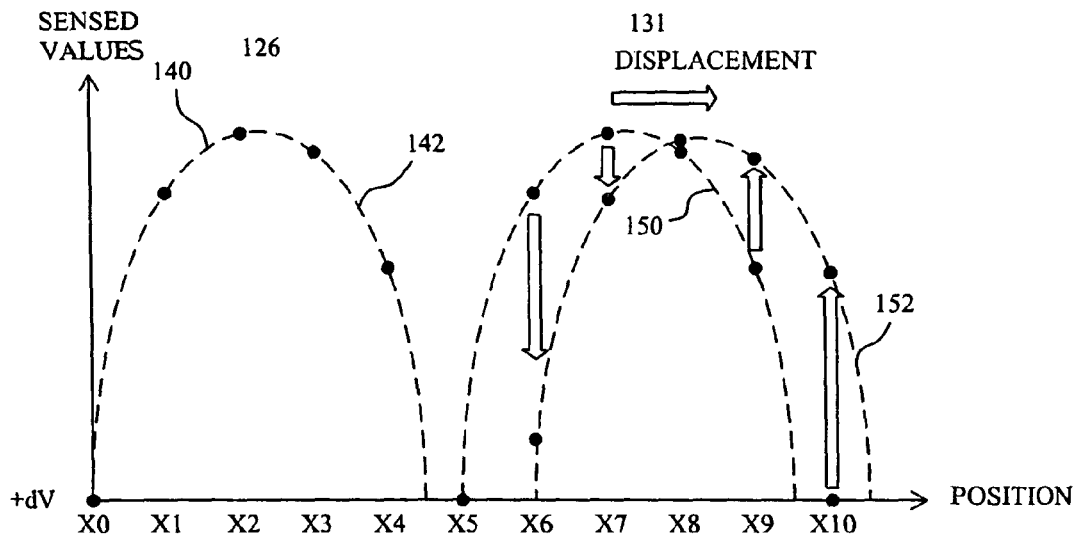
FIG. 10A shows a waveform variation of the sensed values in an embodiment of the present invention.
Figure 10B:
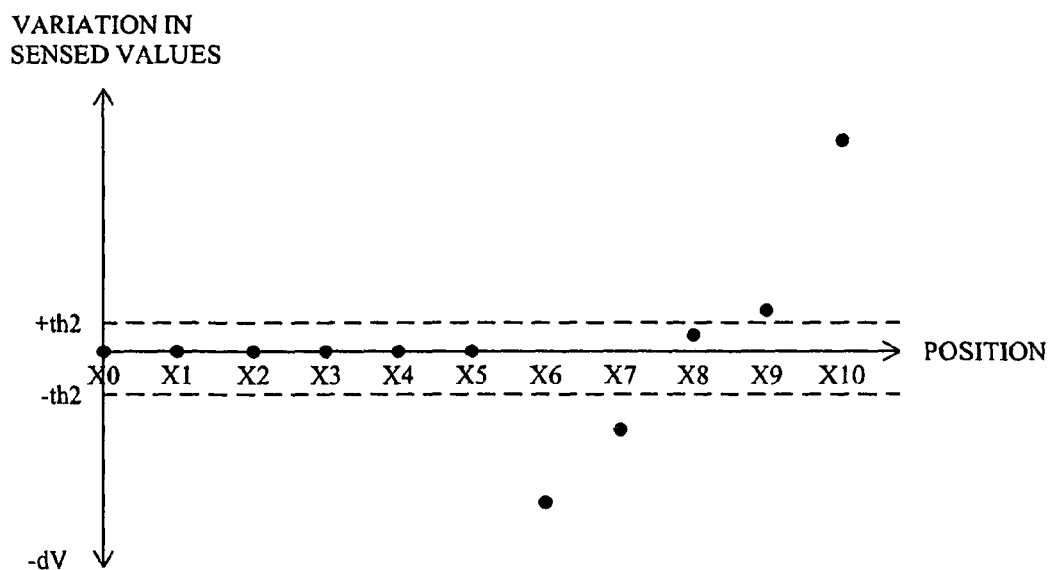
FIG. 10B shows the variation in the sensed values shown in FIG. 10A.

Contrarily, FIGS. 9A to 10B illustrate the sensed values and their variations in the case that the object 122 moves on the touchpad 001 and the object 120 is standstill. By using the same determining method in the above description, FIGS. 9A and 9B represent the case that the object 122 moving leftward, since the absolute value of the variation dV in the region 131 is greater than the threshold value th2 and the sensed values corresponding to the region 131 have a trend of increasing at the left side and decreasing at the right side. Similarly, FIGS. 10A and 10B represent the case that the object 122 has a displacement to the right.

Figure 11B:
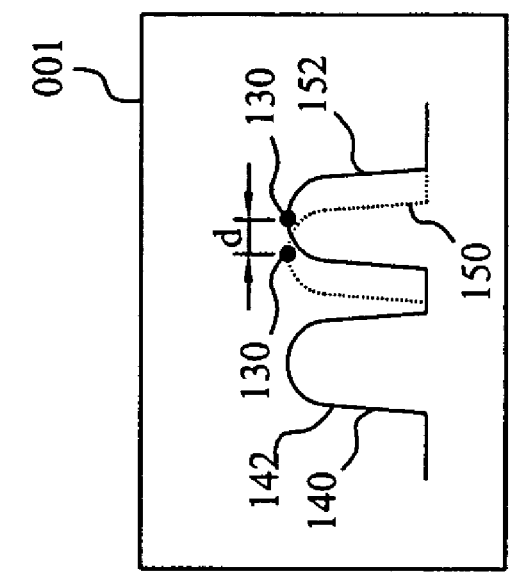
FIG. 11B shows a detection of the displacement of a peak in the waveform of sensed values in an embodiment of the present invention.
Figure 11A:
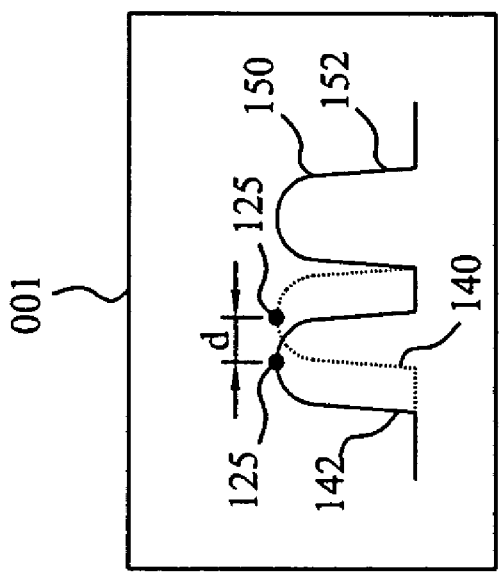
FIG. 11A shows a detection of the displacement of a peak in the waveform of sensed values in an embodiment of the present invention.

In another embodiment, the displacements of the peaks or the centers of mass of the regions 126 and 131 may be used to determine whether or not the objects 120 and 122 move on the touchpad 001. FIGS. 11A and 11B show the waveforms of sensed values on the touchpad 001 of FIG. 5, in either of which the peak of the waveform has a displacement d at two times scanning spaced with a reference time interval therebetween. In FIG. 11A, if the displacement d of the peak 125 in the region 126 between the waveforms 140 and 142 is greater than a threshold value th1, it is determined that the object 120 moves on the touchpad 001. Likewise, as shown in FIG. 11B, if the displacement d of the peak 130 in the region 131 between the waveforms 150 and 152 is greater than another threshold value th2, it is determined that the object 122 moves on the touchpad 001.

Figure 12B:
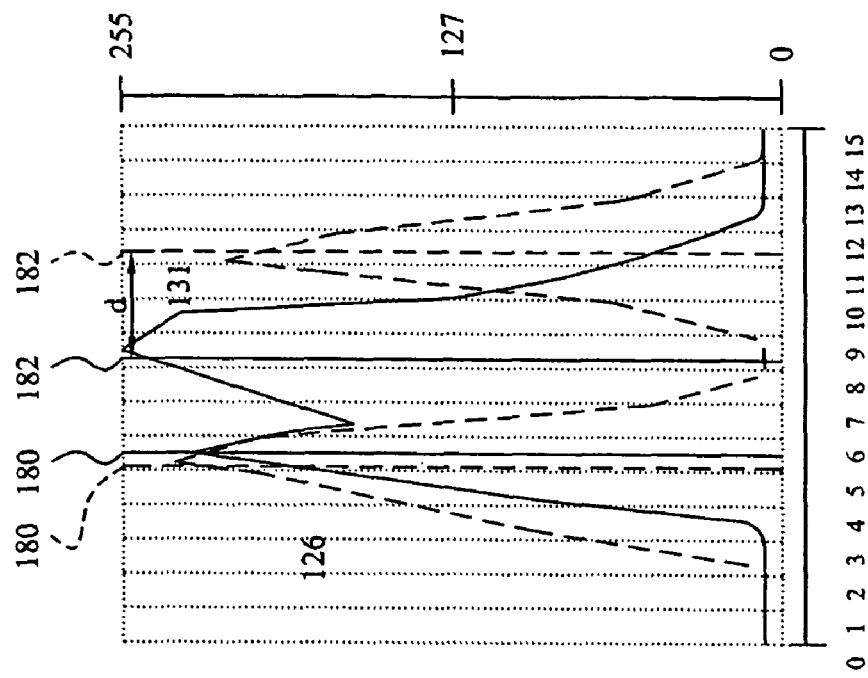
FIG. 12B shows a detection of the displacement of the center of mass of a region in the waveform of sensed values in an embodiment of the present invention.
Figure 12A:
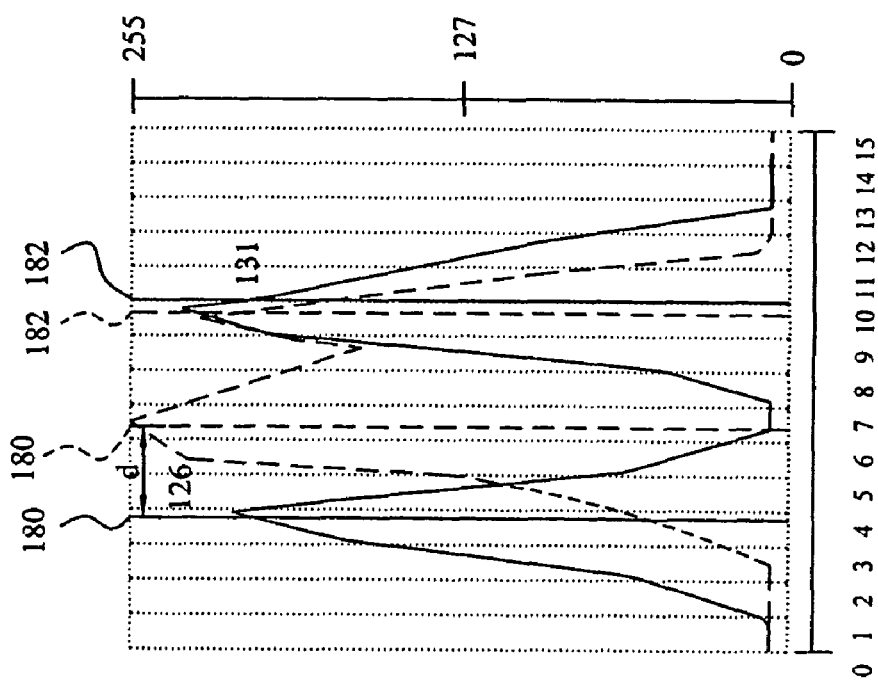
FIG. 12A shows a detection of the displacement of the center of mass of a region in the waveform of sensed values in an embodiment of the present invention.

As shown in FIGS. 12A and 12B, the sensed values on the touchpad 001 of FIG. 5 is detected twice with a reference time interval, and the displacements d of the centers of mass of the regions 126 and 131 are calculated. The center of mass refers to the center of the total sensed quantity caused by object touching on the touchpad 001, and it is usually close to but not necessarily at the peak. In FIG. 12A, if the displacement d of the center of mass of the region 126 between two scannings is greater than a threshold value th1, it is determined that the object 120 moves on the touchpad 001. In FIG. 12B, if the displacement d of the center of mass of the region 131 between two scannings is greater than another threshold value th2, it is determined that the object 122 moves on the touchpad 001.

By using the above illustrated methods, it is determined that the object moves on the touchpad whatever the direction the object moves to. Thereafter, depending on the requirements of the specific applications, it may be produced the corresponding signal, such as including the position information of the object.

<Detection for Multiple Objects Moving Gesture>

Figure 13A:
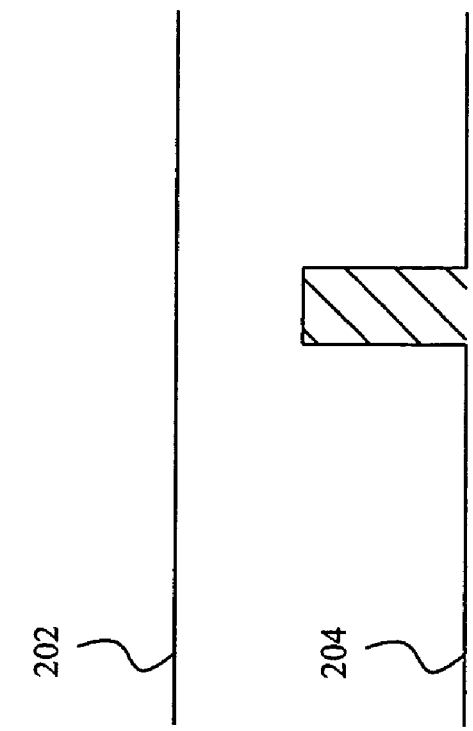
FIG. 13A shows a diagram of two digital signals having an object moving on a touchpad in an embodiment of the present invention.
Figure 13B:
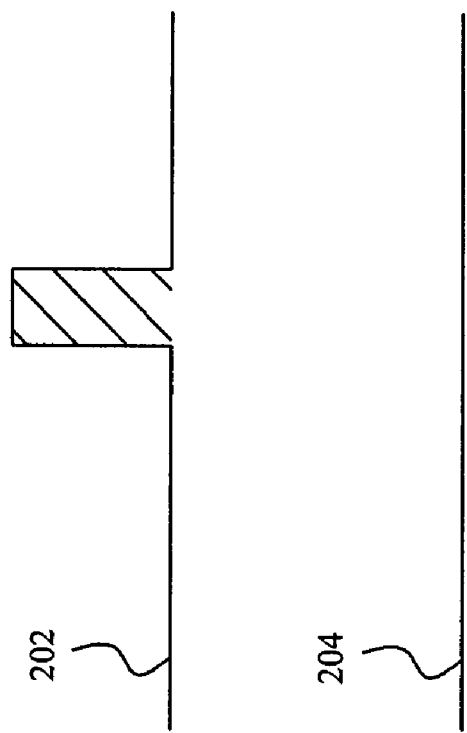
FIG. 13B shows a diagram of two digital signals having an object moving on a touchpad in an embodiment of the present invention.

FIGS. 13A and 13B show two digital signals 202 and 204 produced by a touchpad 001 using the above methods. As usual, the sensed values on the touchpad 001 are detected, and if two objects 120 and 122 are detected touching on the touchpad 001, it is further determined whether either of the objects 120 and 122 moves on the touchpad 001 by the above-mentioned method for determining respective movements of the objects 120 and 122. If it is determined that the object 120 moves on the touchpad 001, the digital signal 202 is produced as shown in FIG. 13A. If it is determined that the object 122 moves on the touchpad 001, the digital signal 204 is produced as shown in FIG. 13B. The digital signals 202 and 204 may comprise the information corresponding to the displacements d of the moving object during a reference time interval, or including the absolute coordinate, the relative coordinate, or the variation in the sensed values of the moving object.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as string forth in the appended claims.

What is claimed is:

1. A movement detection method for multiple objects on a capacitive touchpad, the method comprising the steps of:
    detecting sensed values on the touchpad for obtaining a waveform of the sensed values when the touchpad is touched;
    identifying the waveform for determining a first peak and a second peak thereof;
    determining a first object and a second object on the touchpad if both of the first peak and the second peak are greater than a first threshold value;
    dividing the waveform for defining a first region and a second region corresponding to the first object and the second object, respectively;
    monitoring a first variation in the sensed values within the first region and a second variation in the sensed values within the second region;
    determining the first object moving on the touchpad if the first variation is greater than a second threshold value; and
    determining the second object moving on the touchpad if the second variation is greater than a third threshold value;
    wherein each of the first and second variations is derived directly from the calculated difference between a present sensed value and a subsequent sensed value measured at the same sensed position within a corresponding one of the first and second regions, and the present sensed value and the subsequent sensed value are detected when the touchpad is touched.

2. The method of claim 1, wherein the step of identifying the waveform comprises the step of determining a valley between the first peak and the second peak.

3. The method of claim 2, wherein the step of dividing the waveform comprises the steps of:
    defining two regions in the waveform at two opposite sides of the valley which have the sensed values greater than a fourth threshold value as the first region and the second region, respectively, if the valley is lower than or equal to the fourth threshold value; and
    dividing a region in the waveform which has the sensed values greater than the fourth threshold value into the first region and the second region with the valley as a boundary if the valley is greater than the fourth threshold value.

4. The method of claim 1, wherein the step of monitoring a first variation and a second variation comprises the step of detecting the sensed values on the touchpad twice with a reference time interval and calculating a difference in the sensed values therebetween.

5. The method of claim 1, wherein the step of determining the first object moving on the touchpad comprises the step of determining the first object having a displacement in a first direction if the sensed values in the first region have a trend of increasing in the first direction and decreasing in a second direction opposite to the first direction.

6. The method of claim 1, wherein the step of determining the second object moving on the touchpad comprises the step of determining the second object having a displacement in a first direction if the sensed values in the first region have a trend of increasing in the first direction and decreasing in a second direction opposite to the first direction.

7. The method of claim 1, wherein the step of monitoring a first variation and a second variation comprises the step of monitoring a first displacement of the first peak and a second displacement of the second peak.

8. A movement detection method for multiple objects on a capacitive touchpad, the method comprising the steps of:
    detecting whether or not the touchpad is touched;
    detecting whether or not one or more objects move on the touchpad if there are at least two objects detected in the previous detecting step; and
    producing a respective digital signal corresponding to a respective object which is detected moving on the touchpad in the previous detecting step;
    wherein the step of detecting whether or not one or more objects move on the touchpad comprises the steps of:
    detecting sensed values on the touchpad for obtaining a waveform of the sensed values when the touchpad is touched;
    identifying the waveform for determining a first peak and a second peak thereof;
    determining a first object and a second object on the touchpad if both of the first peak and the second peak are greater than a first threshold value;
    dividing the waveform for defining a first region and a second region corresponding to the first object and the second object, respectively;
    monitoring a first variation in the sensed values within the first region and a second variation in the sensed values within the second region;
    determining the first object moving on the touchpad if the first variation is greater than a second threshold value; and
    determining the second object moving on the touchpad if the second variation is greater than a third threshold value;
    wherein each of the first and second variations is derived directly from the calculated difference between a present sensed value and a subsequent sensed value measured at the same sensed position within a corresponding one of the first and second regions, and the present sensed value and the subsequent sensed value are detected when the touchpad is touched.

9. The method of claim 8, wherein the respective digital signal comprises a displacement of the respective object during a reference time interval.

10. The method of claim 8, wherein the respective digital signal comprises an absolute coordinate or a relative coordinate of the respective object.

11. The method of claim 8, wherein the step of identifying the waveform comprises the step of determining a valley between the first peak and the second peak.

12. The method of claim 11, wherein the step of dividing the waveform comprises the steps of:
   defining two regions in the waveform at two opposite sides of the valley which have the sensed values greater than a fourth threshold value as the first region and the second region, respectively, if the valley is lower than or equal to the fourth threshold value; and
   dividing a region in the waveform which has the sensed values greater than the fourth threshold value into the first region and the second region with the valley as a boundary if the valley is greater than the fourth threshold value.

13. The method of claim 8, wherein the step of monitoring a first variation and a second variation comprises the step of detecting the sensed values on the touchpad twice with a reference time interval and calculating a difference in the sensed values therebetween.

14. The method of claim 8, wherein the step of determining the first object moving on the touchpad comprises the step of determining the first object having a displacement in a first direction if the sensed values in the first region have a trend of increasing in the first direction and decreasing in a second direction opposite to the first direction.

15. The method of claim 8, wherein the step of determining the second object moving on the touchpad comprises the step of determining the second object having a displacement in a first direction if the sensed values in the first region have a trend of increasing in the first direction and decreasing in a second direction opposite to the first direction.

16. The method of claim 8, wherein the step of monitoring a first variation and a second variation comprises the step of monitoring a first displacement of the first peak and a second displacement of the second peak.

* * * * *